United States Patent [19]

Melcher et al.

[11] 4,156,361

[45] May 29, 1979

[54] CALIBRATABLE ELECTROMAGNETICALLY COMPENSATING BALANCE

[75] Inventors: Franz J. Melcher, Ellierode; Heribert Rosenkranz, Göttingen, both of Fed. Rep. of Germany

[73] Assignee: Sartorius-Werke GmbH, Göttingen, Fed. Rep. of Germany

[21] Appl. No.: 758,854

[22] Filed: Jan. 12, 1977

[30] Foreign Application Priority Data

Jan. 14, 1976 [DE] Fed. Rep. of Germany ....... 2601165

[51] Int. Cl.² .......................................... G01G 23/00
[52] U.S. Cl. ............................... 73/1 B; 177/210 EM
[58] Field of Search ............ 73/1 B; 177/25, 210 EM, 177/165, 50, 1; 235/151.3, 151.33

[56] References Cited

U.S. PATENT DOCUMENTS

| | | | |
|---|---|---|---|
| 2,832,535 | 4/1958 | Sherman | 177/31 |
| 2,974,518 | 3/1961 | Jones | 117/16 |
| 3,738,439 | 6/1973 | Herbert | 177/50 |
| 3,786,883 | 1/1974 | Kunz | 177/210 EM |
| 3,889,540 | 6/1975 | Widmer | 73/432 A |
| 3,976,150 | 8/1976 | Wilson et al. | 73/1 B |

*Primary Examiner*—S. Clement Swisher
*Attorney, Agent, or Firm*—Browdy & Neimark

[57] ABSTRACT

A calibratable electromagnetically compensating precision balance having a weighing and taring device, in the form of a pan support, is provided with a parallel guide. The output from the balance is fed to an analog-digital converter which has its output coupled, via a minicomputer (calculator), to a display. A reference weight is provided for the balance. The reference weight is externally switchable for its weight determination, i.e., from outside the housing of the balance. A lifting mechanism is provided to lift the pan from the support. A method for compensating the parameters of the above-described calibratable electromechanical balance which can influence sensitivity and accuracy, involves determining and recording the actual value (M) of reference weight, under the prevailing operating conditions using the balance. Forming a quotient from the actual measured value (M) and the set (given) value (m) of the reference weight, the quotient being expressed in the form of a factor (F). Thereafter, multiplying the corresponding measured value of material to be weighed by the correction factor (F) before displaying the value. The correction factor is stored in a memory operatively associated with the minicomputer.

21 Claims, 4 Drawing Figures

CALIBRATABLE ELECTROMAGNETICALLY COMPENSATING BALANCE

BACKGROUND OF THE INVENTION

This invention relates to a calibratable, electromagnetically compensating balance, especially a precision balance, with a weighing and taring device in the form of a pan support and a parallel guide associated therewith. The present invention relates more particularly to such a balance having an analog-digital converter and a display. The invention is concerned additionally with a method of compensating parameters of the calibratable electromechanical balance which influence sensitivity and accuracy. The term "precision balance" as used herein and according to DIN standards includes all types of analytical balance and microbalances.

In all such balances, a reference or a reference parameter must be provided for the incorporated analog-digital converter for comparison, in order to allow a digital signal to be produced which corresponds to the analog measurement signal. In a known embodiment of a calibratable, electromagnetically compensating balance, an electronic reference is used for this purpose, for example a reference diode, with a circuit associated therewith, which can be turned on and off from the outside. This reference technique, however, is very costly from the standpoint of the circuit technology involved and requires extremely accurate components, such as resistors, amplifiers, magnet systems, and the like, which are very expensive. Despite the expense associated with the circuit technology, however, certain long-term effects, such as drift and temperature influences, cannot be eliminated to the required degree, in order to achieve and reliably ensure the required accuracy. Such long-term effects, however, are especially disadvantageous in the case of calibratable balances, since the latter are sealed and it is not possible to recalibrate these balances to improve accuracy within the set calibration periods, generally two years. It is consequently impossible to do so.

In a further known electromagnetically compensating weighing device, which can be made in the form of a calibratable balance, two toroidal coils are provided, one load coil associated with the load part and one reference coil associated with the reference part, attached to a support loaded with a constant weight. The coils are in the same magnetic system, namely in an air gap between a housing made of magnetic material and a permanent magnet disposed centrally therein. Here the two coils are guided movably and in parallel independently of one another by means of resilient supports; deflections, for example during a weighing process, are determined by a pair of zero-position detectors. The coils are returned to their initial positions, using expensive switching arrangements, by corresponding compensating currents, wherein the mechanical forces correspond to the parameters to be compensated and the compensating current is applied periodically to the load coil, controlled by an associated circuit.

In this known weighing device, a reference mass is constantly applied, so that the balance can operate as a quotient meter, wherein the quotient is constantly determined from the mass to be weighed and the reference mass. A device of this sort is very expensive, however, since practically speaking, two balances must be provided in one instrument. In addition, substantial difficulties arise in conjunction with the parallel guidance, since in the case of a coaxial arrangement of the reference mass and the weighing part for example, parallel arms of different lengths are used, which exhibit pronounced deviations as a function of the actual position as well as the installation site of the balance and as a function of ambient conditions, particularly temperature, in the area of the required high accuracy. Moreover, such double parallel guides require an extremely precise choice of materials as well as a very exact manufacture of the parallel arms. A weighing device of this known type is disclosed in German Auslegeschrift No. 2,223,850.

Hence, the principal aims of the present invention are to provide a calibratable, electromechanical balance of the type described hereinabove, a method for compensation of the parameters of these balances which influence sensitivity and accuracy, as well as a device for carrying out the method, wherein, by means of a small additional expenditure on structural and circuit technology, any of the error parameters which influence the weighing results of the calibratable electromagnetic balance, as for example the dependence on the earth's magnetic field which is determined by the installation site, temperature, humidity changes, and the like, the variations in and aging of the structural elements and the supply devices, as well as changes in the geometric, electrical, and electromechanical parameters can be completely eliminated and ruled out.

SUMMARY OF THE INVENTION

It is the principal object of the present invention to provide a solution of the problems set out above in a calibratable electromagnetic balance of the type described hereinabove.

According to the present invention, a reference weight is provided in a balance and is externally switchable to determine its weight, i.e., from outside the balance housing, and a lifting mechanism is provided to lift the pan off its carrier.

According to an advantageous embodiment of the present invention, a control device which can be actuated outside the housing of the balance, for example a cam plate system, is provided for switching the reference weight in the balance, the cam plate arrangement being connected by a lever mechanism with a lowering device operatively associated with the reference weight and the lifting device of the balance. Further advantageous variants of the cam plate arrangement are possible, as can be seen from the text hereinbelow.

In addition, according to the present invention, a method is provided for compensating those parameters of calibratable electromechanical balances of the type described hereinabove which influence sensitivity and accuracy, wherein the actual value of the reference weight under the specific prevailing operating conditions is determined and recorded using the balance, by the fact that a quotient is then determined from the actual value determined and the set value of the reference weight, the quotient being expressed in the form of a factor, and by the fact that the corresponding measured value of the material to be weighed is then multiplied by the correction factor before being displayed. According to advantageous embodiments of the method according to the present invention, the correction factor thus determined can be stored mechanically, electronically, or electromagnetically.

In addition, in a device for carrying out the method according to the invention described hereinabove, provision is made that in order to form the quotient from the actual and set value of the reference weight, i.e., the correction factor, a minicomputer (calculator) is connected between the analog-digital converter and the display, and a memory is provided connected to the minicomputer. Here the memory associated with the minicomputer can be a manually adjustable memory in the form of a conventional manually operable switch means, such as thumb switches, an electromagnetic memory, or a semiconductor memory in the form of a random memory (RAM).

According to the present invention in its apparatus aspect, a switchable reference weight is provided in a calibratable, electromechanical balance, the weight being capable of being switched from outside the housing of the calibratable balance, so that under the appropriate operating conditions, its actual value can be determined. This actual value is then compared with the set value of the reference weight preferably in a minicomputer and a quotient is then formed from these two values, the quotient then being stored in the form of a factor. The weighings of material subsequently carried out using the balance are then multiplied by the factor determined previously using the above-described technique, and the result is a measurement which appears on a display associated with the balance. Thus, practically all possible sources of error have been ruled out and eliminated. The present invention therefore provides a balance which is simple from both structural and circuit technology standpoints, wherein weighings can be always carried out with the same and a high degree of accuracy and ease.

DETAILED DESCRIPTION OF THE PREFERRED EMBODIMENTS

Figure 1A:
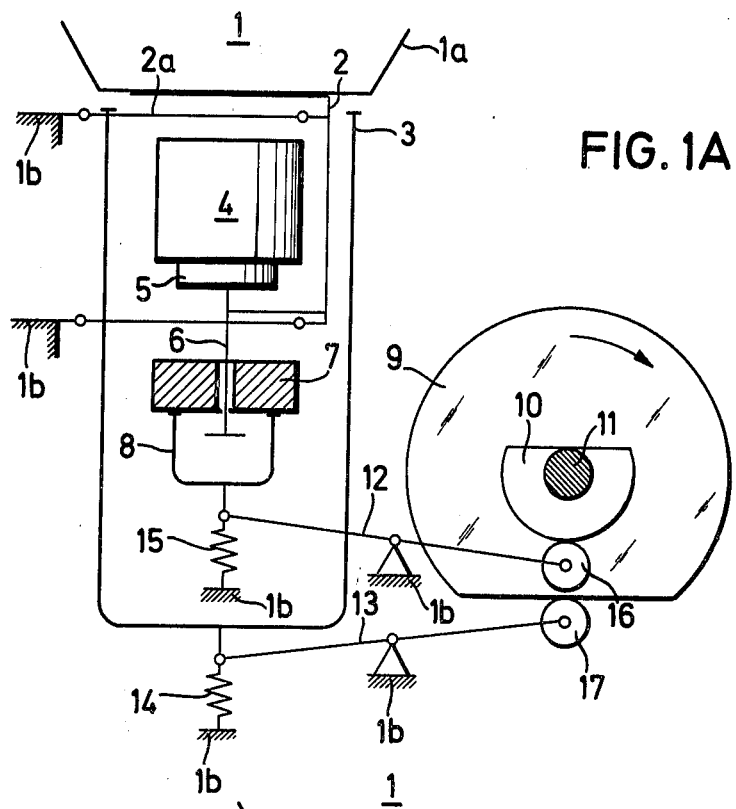
FIG. 1A is a schematic representation of an exemplary embodiment of a calibratable, electromechanical balance according to the present invention in its weighing position.

In FIG. 1A, those parts of a calibratable electromechanical balance 1 which are important in conjunction with the present invention are shown. A pan 1a is placed on a support 2, the pan 1a being hinged through a parallel support 2a to a housing 1b of the balance 1, the housing 1b being shown schematically. A lifting mechanism 3 is shown in FIG. 1A lowered to the point where it does not influence weighing. A pot magnet 4 and a coil 5, movable therein, is disposed inside the lifting mechanism 3; a support 6 is attached to the coil 5, to which the support 2 is connected by a conventional cross connection, not shown in greater detail. A reference weight 7 having a set (given) value (m) is shown in FIG. 1A disposed beneath the parallel support 2a, the reference weight 7 being liftable off the support 6 by a diagrammatically shown lowering device 8. In addition, FIG. 1A shows a drive shaft 11 which can be actuated by hand mechanically or by a motor, to which similarly designed cam plates 9 and 10 are fixedly fastened in such manner that, as shown in FIG. 1A, they are at 180° to one another, with respect to their respective arcuate portions. Respective rollers 16 and 17 (cam followers) rest respectively on the camming surface of the two cam plates 9 and 10, the rollers 16 and 17 being rotatably mounted, each at one end of respective levers 12 and 13. The other two ends of the levers 12 and 13 are connected respectively to springs 15 and 14 respectively, which are fastened between the schematically shown housing 1b and the lowering device 8 and lifting mechanism 3. The two levers 12 and 13 in the illustrated embodiment are pivoted at approximately the center on the balance housing 1b.

As can be seen from FIG. 1A, the weighing position of calibratable balance 1 is shown. Here the lifting mechanism 3 has been lowered to the point where the pan 1a placed on the support 2 and hence the weighing itself are not influenced. The reference weight 7 is lifted from the support 6 by the lowering device 8. The drive shaft 11 and the cam plates 9 and 10 attached thereto are in their initial positions, and the rollers 16 and 17 rest on the respective cam plates 9 and 10 under the influence of the respective springs 14 and 15, which, as illustrated in FIG. 1A, are preferably extension springs. The roller 17 rests against the flat portion of the camming surface of the cam plate 9, while the roller 16 rests against the arcuate portion of the camming surface of the cam plate 10.

Figure 1B:
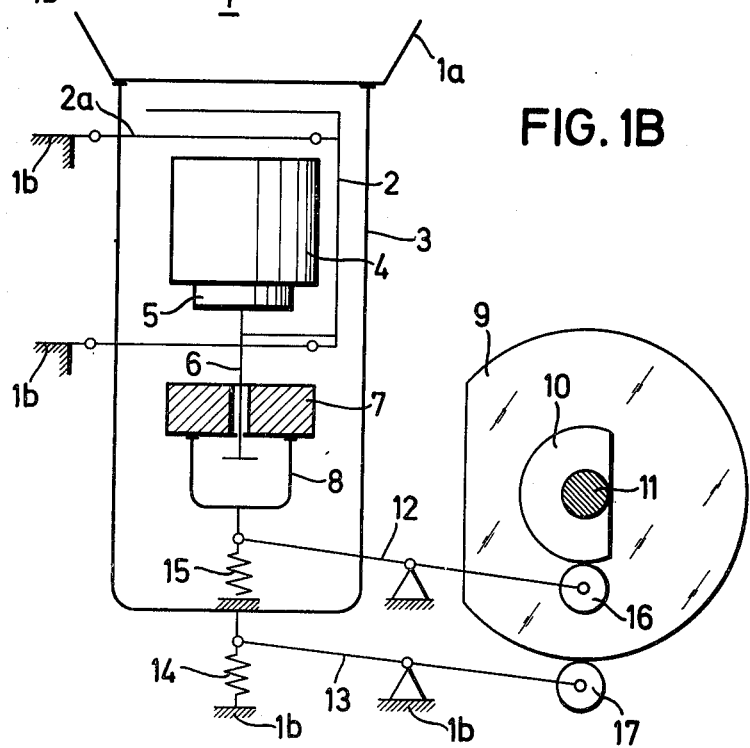
FIG. 1B is a schematic representation of the balance shown in FIG. 1A, in its taring position.

If the balance is to be tared after a weighing has been completed, it is placed in taring position shown in FIG. 1B. For this purpose, the drive shaft 11 is rotated either by hand (mechanically or by a motor, not shown, together with the cam plates 9 and 10 attached thereto) 90° in a clockwise direction. This rotation does not influence the position of the reference weight 7, so that it remains in the raised position. On the other hand, the pan 1a is lifted off the support 2, by the lifting mechanism 3 which has been lifted by the lever 13, controlled by the cam plate 9. As soon as the balance 1 reaches the position shown in FIG. 1B, a control pulse is delivered by a conventional microswitch (not shown) to an automatic taring device, thereby resetting to zero a conventional scaled measuring device (not shown) or a display, as the case may be.

Figure 1C:
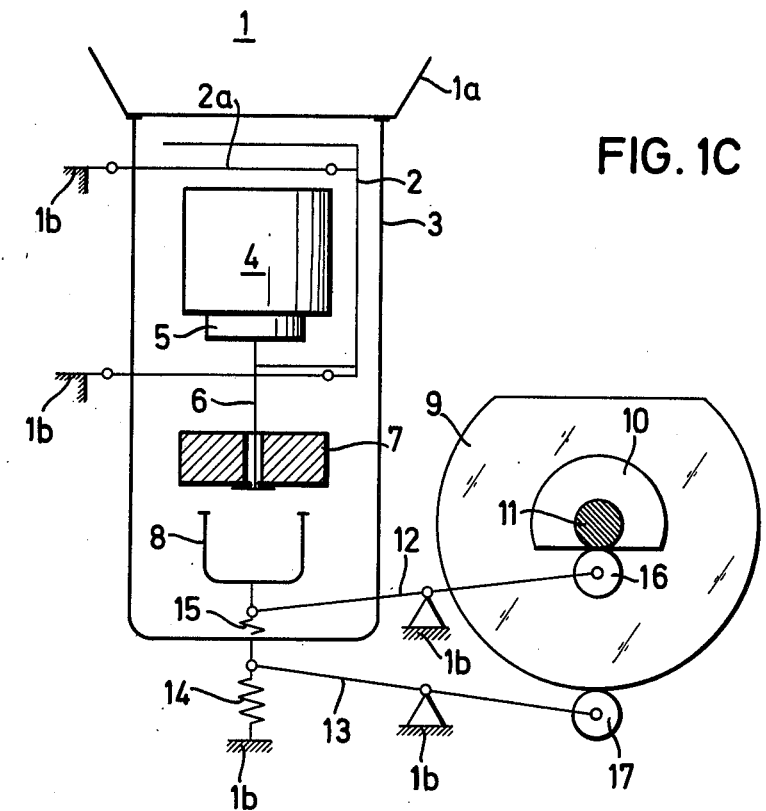
FIG. 1C is a schematic representation of the balance shown in FIG. 1A, in a position in which the actual measured value of a reference weight is determined.

If the reference weight 7 is to be weighed after the taring described above, the balance 1 is set to the position shown in FIG. 1C. For this purpose, the drive shaft 11 together with cam plates 9 and 10 attached thereto is rotated a further 90° clockwise. Then the reference weight 7 is lowered onto the support 6 by the lowering device 8 which is under the control of the cam plate 10, the roller 16 and the lever 12, influenced by the spring 15. Thus, the position of the reference weight 7 shown in FIG. 1C is obtained. By means of a second conventional microswitch (not shown), an additional control pulse is delivered to an electronic device on the balance, whereupon the actual measured value of the reference weight 7 under current operating conditions is determined and recorded. By means of this actual value of reference weight 7, a correction factor can be determined, as is to be described in greater detail with reference to FIG. 2.

After weighing the reference weight 7, the balance 1 is then returned to the weighing position shown in FIG. 1A by turning the drive shaft 11 and the cam plates 9 and 10 connected therewith back through 180° counterclockwise.

Figure 2:
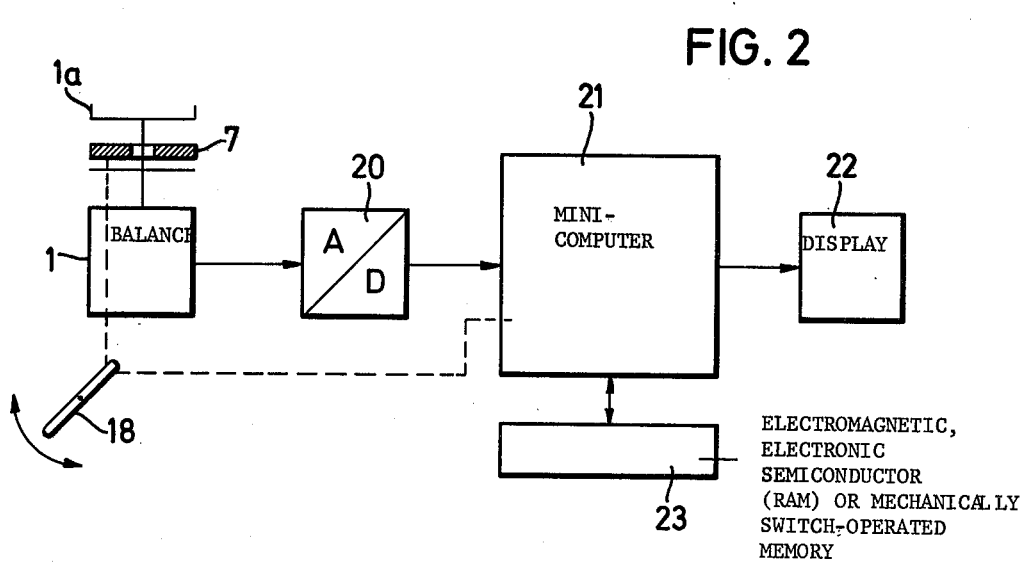
FIG. 2 is a schematic representation of the balance shown in FIGS. 1A–1C in combination with associated devices, illustrated in block diagram form, for carrying out the method according to the invention.

In FIG. 2, the balance 1, is shown as a block together with the pan 1a, the balance 1 being connected in known manner to an analog-digital converter 20. In addition, FIG. 2 shows the reference weight 7, which can be raised or lowered by the lowering device, between the pan 1a and the balance 1. At the lower left in FIG. 2, the control mechanism, shown in detail in FIGS. 1A to 1C, is shown schematically in the form of a switch lever 18.

A minicomputer 21 (calculator) is provided between the analog-digital converter 20 and a conventional display 22 usually employed. A memory 23 is coupled to the minicomputer 21. The memory 23 can be a mechanical memory, for example in the form of switch means, such as conventional thumb-wheel switches; however, an electromagnetic memory or a memory composed of semiconductors, preferably in the form of a RAM, can be used equally well. However, the latter two types of memories have the disadvantage that the contents of the memory are lost when the supply voltage is shut off, and must be reentered.

In order to determine a correction factor F, the balance must be tared in the unloaded state, shown in FIG. 1B. Then, as described above in detail with reference to FIG. 1C, the reference weight 7 is lowered onto the support 6 and its actual measure value M is determined; the set value m of the reference weight 7 is known. Then the quotient of the known set value m and the determined actual value M of the reference weight 7 is automatically generated in the minicomputer 21; the correction factor F then appears on the display 22 and can be entered, for example manually, in the memory 23. If memory 23 is an electromagnetic memory or a memory composed of semiconductors, the correction factor F thus determined can automatically be entered simultaneously with its display on the display 22 in the memory register 23. After the correction factor F has been stored in the memory 23, this being a six-place factor in order to provide the necessary degree of accuracy for precision balances, the normal weighing process can begin.

After the reference weight 7 has again been lifted off the support 6 (see FIG. 1A), a certain amount of the material to be weighed can be placed on the pan 1a. The net value N of the material to be weighed can then be multiplied in the minicomputer 21 by the correction factor F stored in memory 23, so that the display 22 then shows a value A=F·N, which then constitutes the actual weight of the material being weighed.

It is to be understood that the foregoing description and accompanying drawings relate to embodiments set out by way of example, not by way of limitation. Various other embodiments and variants are possible without departing from the spirit and scope of the invention, its scope being defined in the appended claims.

The memory 23, in its manually adjustable form, may take the form of a commercially available switch device sold under the brand name Contraves, Stuttgart, W. Germany as type Multiswitch A.

The minicomputer 21 may take the form of a conventional calculator. One minicomputer which is suitable for use for circuit component 21 is a minicomputer (calculator) available from Intel as type 4040 (4 bit-Prozessor).

What is claimed is:

1. In a calibratable electromagnetically compensating balance, such as a precision balance, having a housing, a weighing and taring device in the form of a pan support, a parallel guide associated therewith, an analog-digital converter, and a display, the improvement comprising a movable reference weight having a set value (m) positioned within said housing of the balance, externally switchable means for moving said reference weight to its weight-determining position within said housing, a lifting mechanism for lifting said pan from its said pan support, and wherein said switchable means comprises a lowering device, cam means which can be actuated from outside, a lever mechanism coupled between said cam means and said lifting mechanism and between said cam means and said lowering device operatively associated with said reference weight.

2. An improved balance according to claim 1, wherein said cam means comprise two similarly structured cam plates, said plates being angularly displaced relative to one another by 180°; and including a rotatable shaft, said plates being fixedly fastened on said shaft and being supported thereby.

3. An improved balance according to claim 2, including cam followers in the form of a pair of rollers, and wherein said lever mechanism comprises two levers, said levers each carrying on one end thereof one of said rollers, each roller resting on one of cam plates, a second end of one of said levers being engaged with said lowering mechanism associated with said reference weight, and a second end of the other of said levers being engaged with said lifting mechanism of the balance.

4. An improved balance according to claim 3, including spring means, and wherein said two levers of the lever mechanism are held against said cam plates by said springs.

5. An improved balance according to claim 4, wherein said springs are respective tension springs mounted on ends of said levers which are respectively connected to said lowering device and said lifting mechanism.

6. In a calibratable, electromagnetically compensating balance, such as a precision balance, having a housing, a weighing and taring device in the form of a pan and pan support, a parallel guide associated therewith, an analog-digital converter, and a display, the improvement comprising a movable reference weight having a set value (m) position within said housing of the balance, externally switchable means for moving said reference weight to its weight-determining position within said housing, a lifting mechanism for lifting said pan from its said pan support, a lowering device, and a support for said reference weight, said support being connected with a coil means and upon which said reference weight can be placed by said lowering device, said lowering device being actuatable by control means.

7. In an electromagnetically compensating balance, such as a precision balance, having a housing, a weighing and taring device in the form of a pan and pan support, guide means associated therewith, and a display, the improvement comprising a movable reference weight having a set value (m) positioned within said housing of the balance, externally switchable means for moving said reference weight to its weight-determining position within said housing, and a lifting mechanism for lifting said pan from its said pan support and wherein said switchable means comprises a lowering device, cam means which can be actuated from outside and a lever mechanism coupled between said cam means and said lifting mechanism and between said cam means and said lowering device operatively associated with said reference weight.

8. An improved balance according to claim 7, wherein said cam means comprise two similarly structured cam plates, said plates being angularly displaced relative to one another by 180°; and including a rotatable shaft, said plates being fixedly fastened on said shaft and being supported thereby.

9. An improved balance according to claim 8, including cam followers in the form of a pair of rollers, and wherein said lever mechanism comprises two levers, said levers each carrying on one end thereof one of said rollers, each roller resting on one of cam plates, a second end of one of said levers being engaged with said lowering mechanism associated with said reference weight, and a second end of the other of said levers being engaged with said lifting mechanism of the balance.

10. An improved balance according to claim 9, including spring means, and wherein said two levers of the lever mechanism are held against said cam plates by said springs.

11. An improved balance according to claim 10, wherein said springs are respective tension springs mounted on ends of said levers which are respectively connected to said lowering device and said lifting mechanism.

12. In an electromagnetically compensating balance, such as a precision balance having weighing and taring means in the form of a pan and pan support, an analog/digital converter, a display device, control means for adding and subtracting a reference weight, and lifting means for lifting the pan from its said pan support, the lifting means including a lever arrangement, the improvement comprising a cam means including a first movable cam and a second movable cam, and wherein said lever arrangement comprises a first lever having one end coupled to the camming surface of said first movable cam and a second end coupled to said control means for moving said control means in accordance with the position of said first movable cam, and a second lever having one end coupled to the camming surface of said second movable cam and a second end coupled to said lifting means for moving said lifting means in accordance with the position of said second movable cam.

13. An improved balance in accordance with claim 12, including respective rollers carried on respective first ends of said first lever and said second lever, said rollers being in contact with a respective one of said camming surfaces of said cams.

14. An improved balance according to claim 12, wherein said first cam and said second cam are respective cam disks having substantially identical angular developed camming surfaces, and including a shaft, said first cam and said second cam being carried by said shaft for rotation therewith.

15. An improved balance according to claim 14, wherein said camming surfaces of said first cam and said second cam are positioned for conjoint rotation with said shaft and are displaced angularly from one another by substantially 180°.

16. An improved balance according to claim 12, including a first spring and a second spring, and wherein said first lever and said second lever are respectively held in coupled relationship with said first cam and said second cam by respective ones of said springs.

17. An improved balance in accordance with claim 16, wherein said springs are respectively mounted on respective said second ends of said levers as tension springs, whereby said levers act respectively on said control means and on said lifting means.

18. An improved balance according to claim 12, including computer means provided with a memory and coupled between said analog/digital converter and said display device for developing a quotient from actual (M) value and set (m) value of a reference weight, that is, a correction factor (F).

19. An improved balance according to claim 18, wherein said memory forming part of said computer means is a manually adjustable memory in the form of a Contraves-switch.

20. An improved balance according to claim 18, wherein said memory forming part of said computer means is an electromagnetic memory.

21. An improved balance according to claim 18, wherein said memory forming part of said computer means is a PAM of semiconductive material.

* * * * *